United States Patent
Hong et al.

(10) Patent No.: US 12,403,446 B2
(45) Date of Patent: Sep. 2, 2025

(54) ALKANOLAMINE/AMINE-GRAFTED METAL-ORGANIC FRAMEWORK-BASED CARBON DIOXIDE ADSORBENT

(71) Applicant: Korea University Research And Business Foundation, Seoul (KR)

(72) Inventors: Chang Seop Hong, Seoul (KR); Jong Hyeak Choe, Seoul (KR); Yun Seok Chae, Seoul (KR); Doo San Choi, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 596 days.

(21) Appl. No.: 17/916,272

(22) PCT Filed: Jan. 15, 2021

(86) PCT No.: PCT/KR2021/000613
§ 371 (c)(1),
(2) Date: Sep. 30, 2022

(87) PCT Pub. No.: WO2021/153933
PCT Pub. Date: Aug. 5, 2021

(65) Prior Publication Data
US 2023/0148213 A1 May 11, 2023

(30) Foreign Application Priority Data

Jan. 30, 2020 (KR) .................. 10-2020-0011064
Oct. 30, 2020 (KR) .................. 10-2020-0142694

(51) Int. Cl.
*B01J 20/22* (2006.01)
*B01D 53/02* (2006.01)
*B01D 53/64* (2006.01)

(52) U.S. Cl.
CPC ............ *B01J 20/226* (2013.01); *B01D 53/02* (2013.01); *B01D 53/64* (2013.01); *B01D 2253/204* (2013.01)

(58) Field of Classification Search
CPC ................ B01D 2253/204; B01D 2257/504
See application file for complete search history.

(56) References Cited

U.S. PATENT DOCUMENTS 9,457,312 B2 * 10/2016 Schmitt .................. C07F 5/069
10,780,388 B2 * 9/2020 Long ......................... C07F 3/02
(Continued)

FOREIGN PATENT DOCUMENTS

KR    10-2015-0114724 A    10/2015
KR       20150114724 A  * 10/2015 .............. B01J 20/22
(Continued)

OTHER PUBLICATIONS

Fallah-Mehrjardi, M. et al. Nucleophilic ring-opening of epoxides: trends in β-substituted alcohols synthesis, Journal of the Iranian Chemical Society, vol. 15 (May 28, 2018), pp. 2033-2081 (Year: 2018).*
(Continued)

*Primary Examiner* — Magali P Slawski
*Assistant Examiner* — Rachel Marie Slaugovsky
(74) *Attorney, Agent, or Firm* — NSIP Law

(57) ABSTRACT

The present invention relates an alkanolamine/amine-grafted metal-organic framework-based carbon dioxide adsorbent and, more specifically, to an alkanolamine/amine-grafted metal-organic framework-based carbon dioxide adsorbent that can effectively reduce renewable energy generated in the process of adsorption and desorption of carbon dioxide, and maintain structural stability against moisture present in exhaust gas, thereby being capable of effectively capturing carbon dioxide in an actual fluidized
(Continued)

bed. According to the present invention, it is possible to provide a carbon dioxide adsorbent capable of maintaining structural stability against changes in adsorption/desorption temperatures and moisture.

11 Claims, 10 Drawing Sheets

(56) References Cited

U.S. PATENT DOCUMENTS

2021/0197172 A1* 7/2021 Goeppert ............. B01J 20/3491
2021/0268476 A1* 9/2021 Casaban-Julian ............................
                                                       B01J 20/28064

FOREIGN PATENT DOCUMENTS

| KR | 10-2016-0126693 A | 11/2016 | | |
|----|-------------------|---------|---|---|
| KR | 10-2017-0127416 A | 11/2017 | | |
| KR | 10-2018-0117023 A | 10/2018 | | |
| KR | 20180117023 A | * 10/2018 | ............ | B01J 20/226 |
| KR | 10-2019-0076891 A | 7/2019 | | |

OTHER PUBLICATIONS

Fallah-Mehrjardi, M. et al. Nucleophilic ring-opening of epoxides: trends in B-substituted alcohols synthesis, Journal of the Iranian Chemical Society, vol. 15 (May 28, 2018), pp. 2033-2081 (Year: 2018).*

Nakajima, Akira, et al. "Sliding of water droplets on smooth hydrophobic silane coatings with regular triangle hydrophilic regions." *Langmuir* vol. 29. Issue 29 (2013). pp 1-7.

Korean Office Action issued on Mar. 13, 2022, in corresponding Korean Patent Application No. 10-2020-0142694 (6 pages in Korean).

* cited by examiner

[Fig.1]
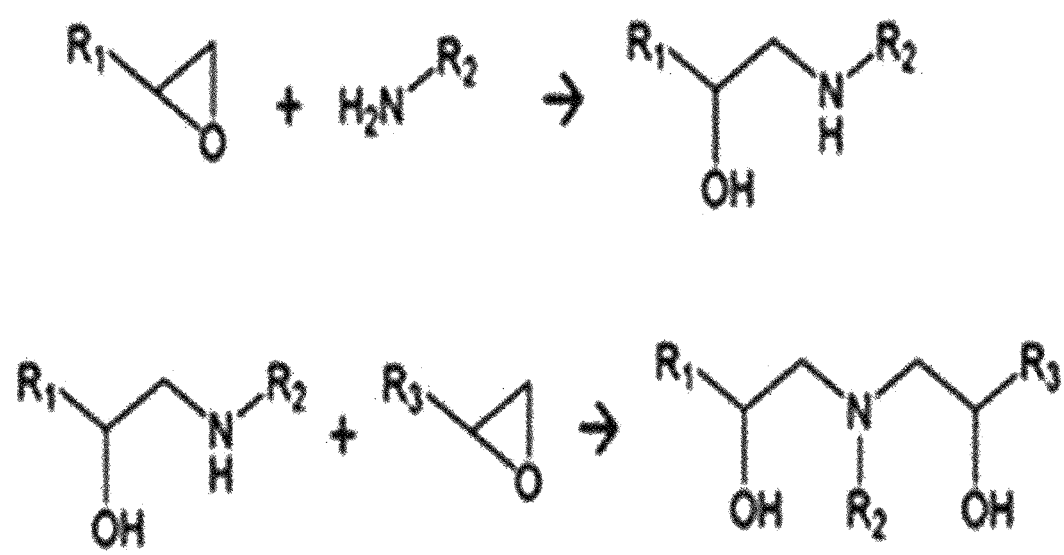

【Fig.2】
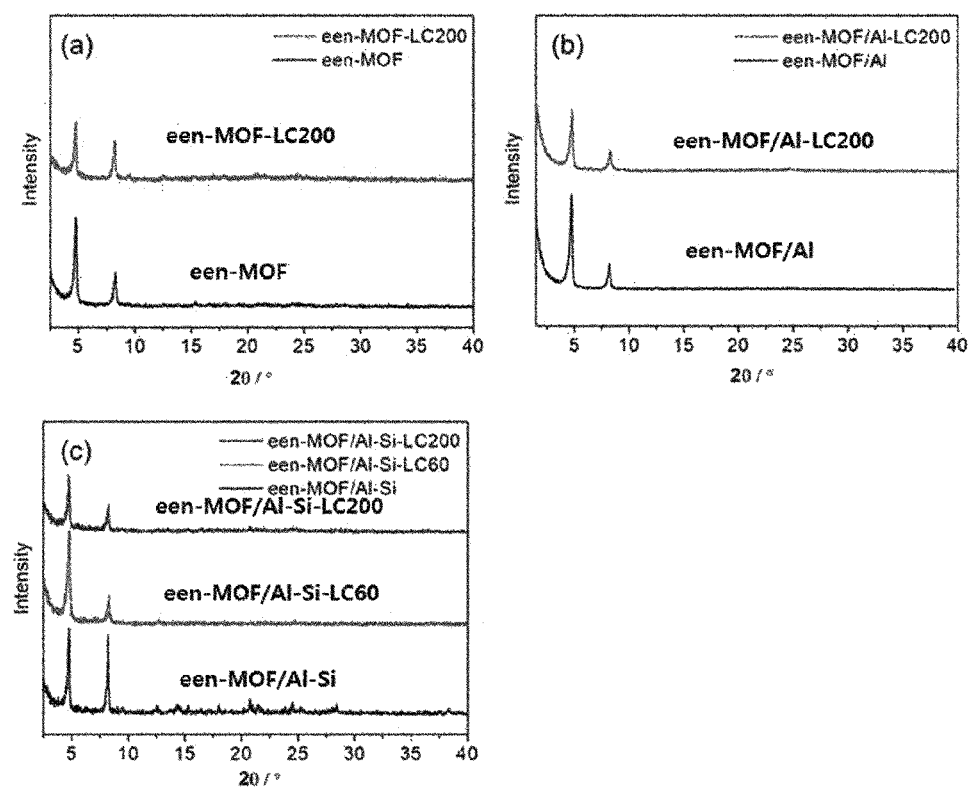

[Fig.3]
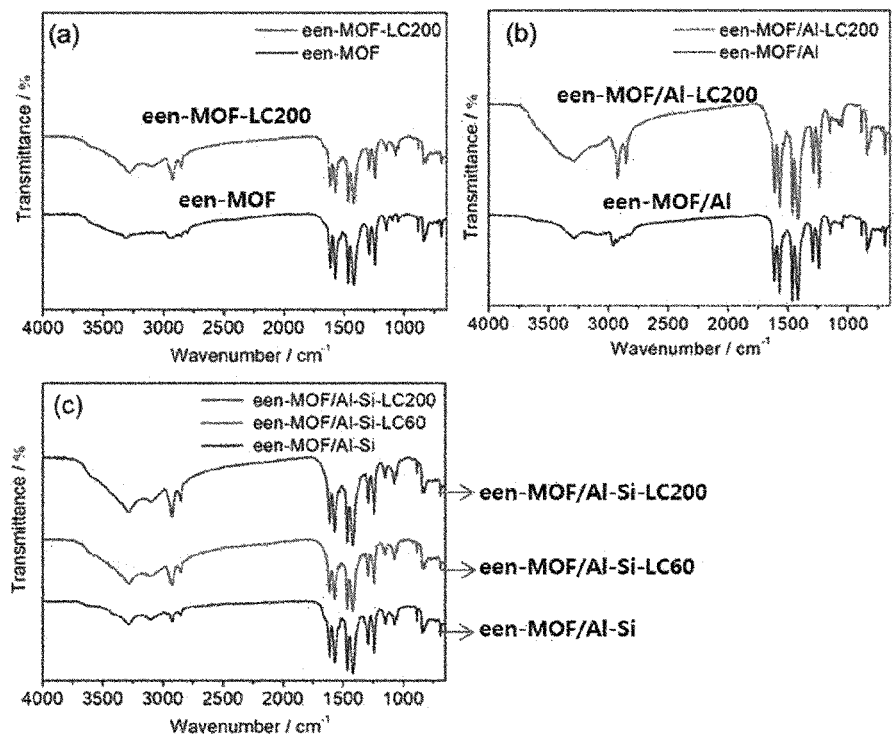
[Fig.4]
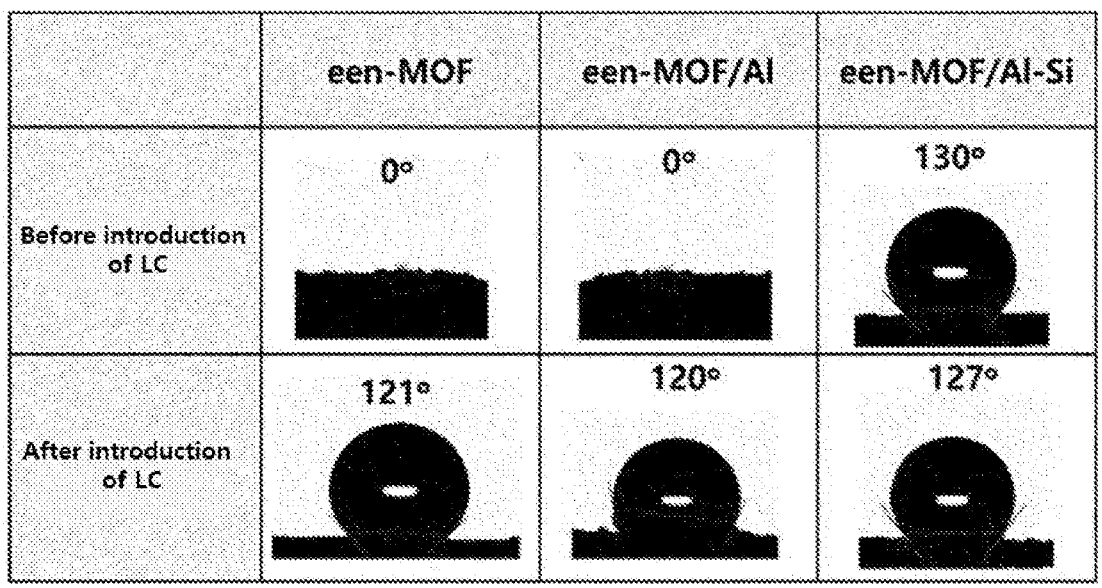

【Fig.5】
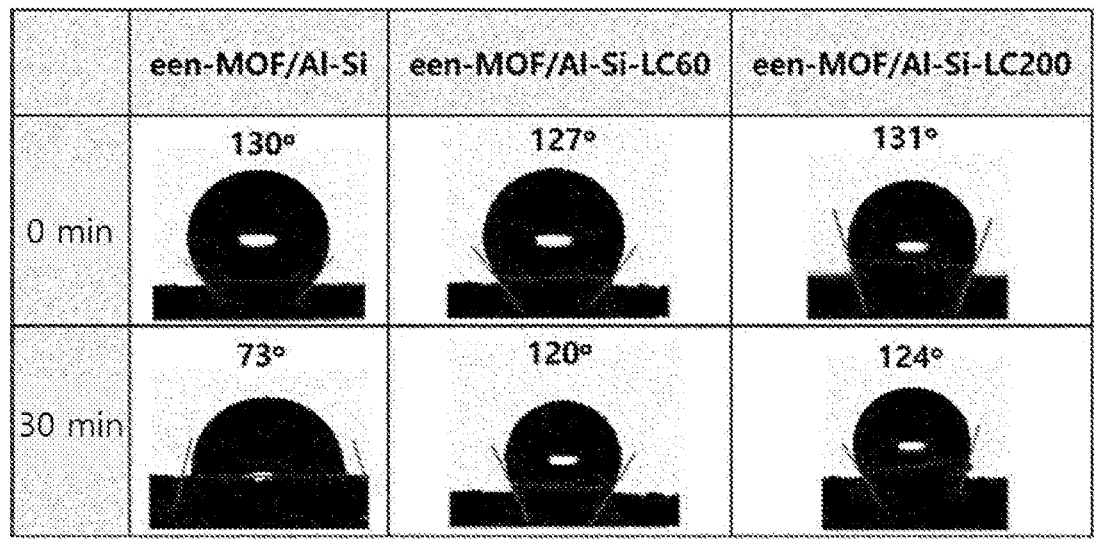
【Fig.6】
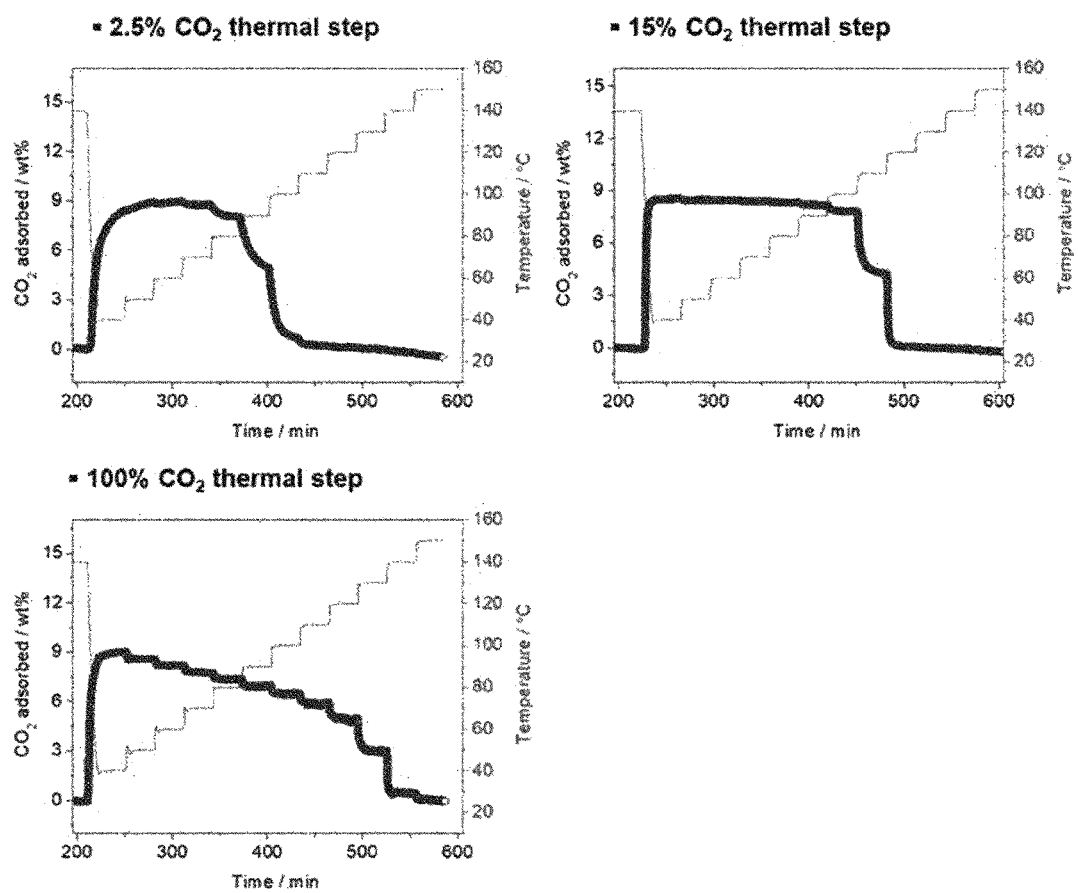

[Fig.7]
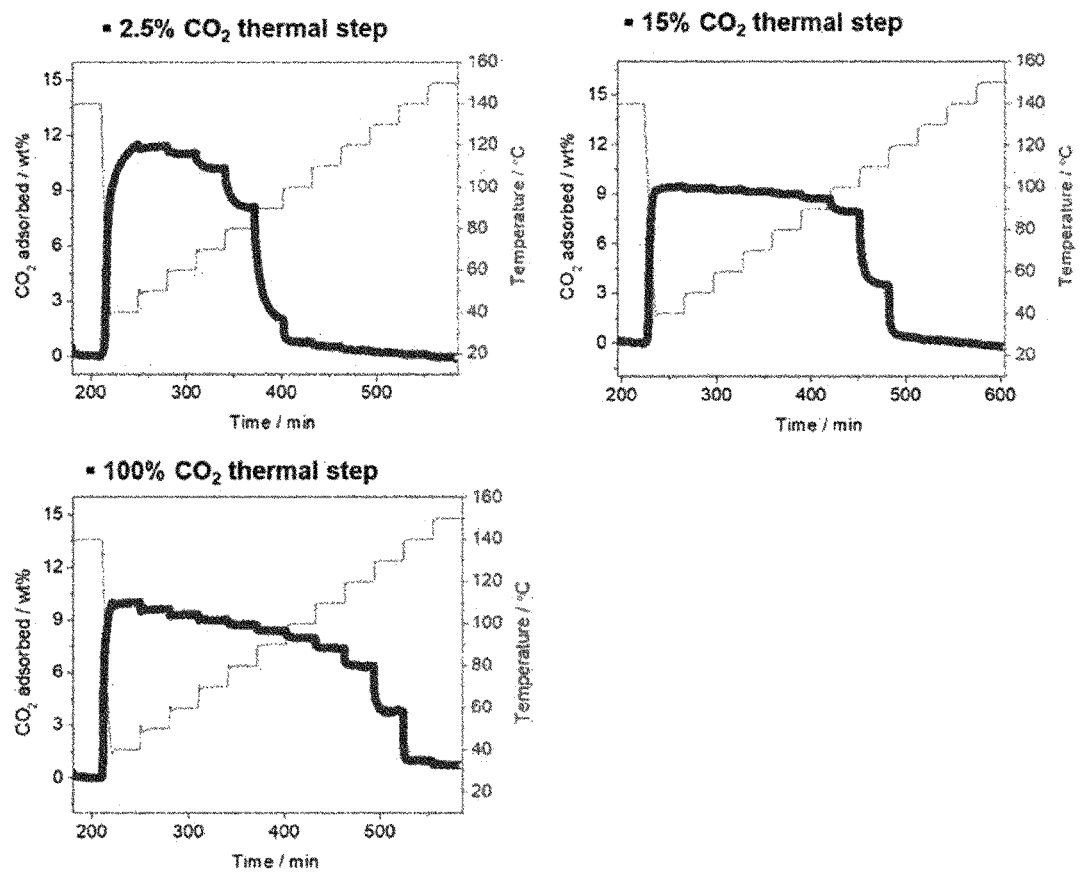

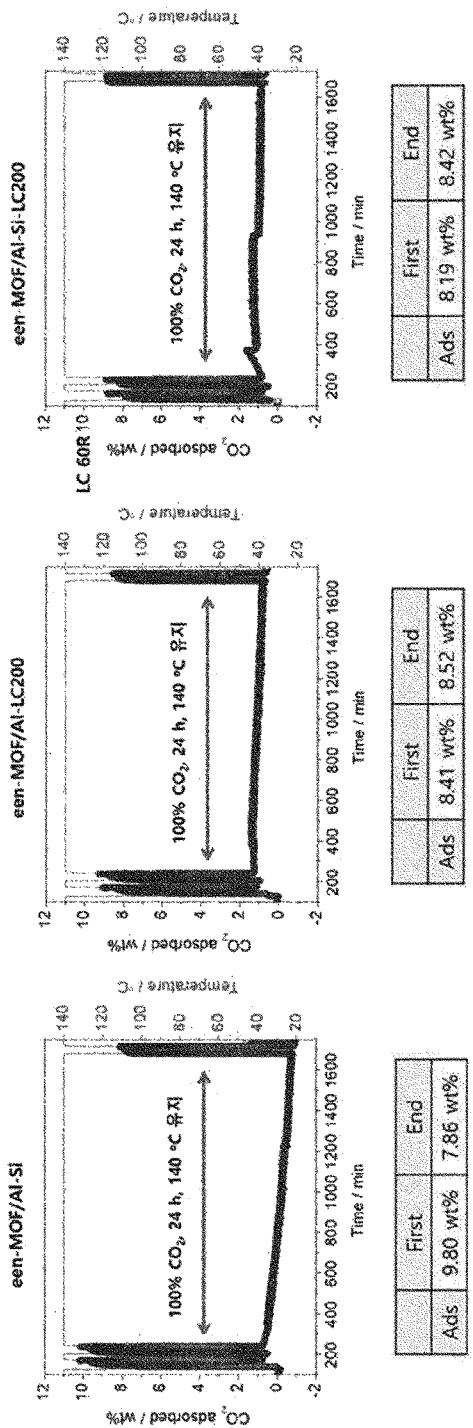
[Fig. 8]

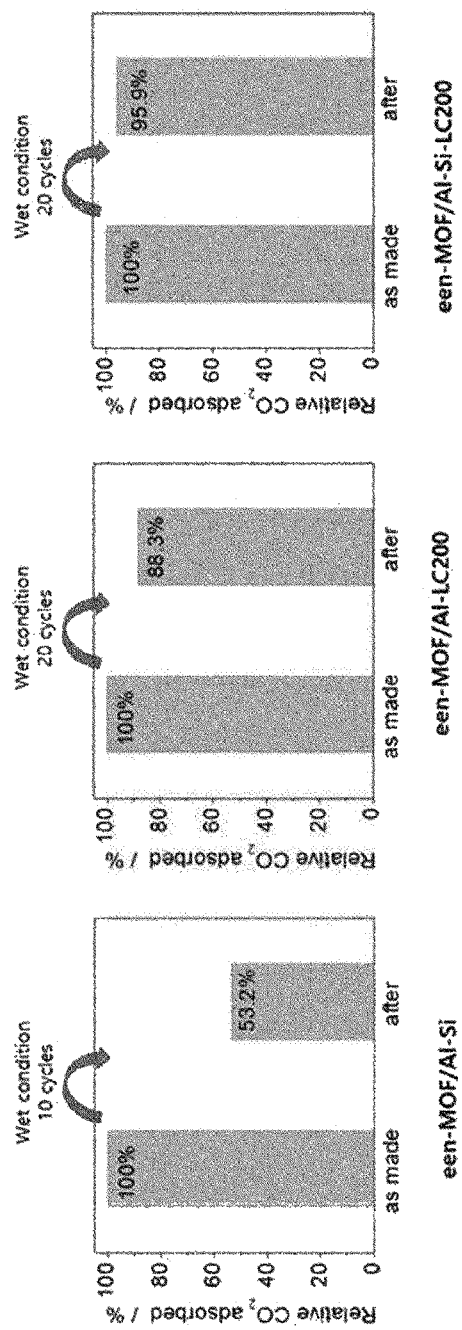
[Fig. 9]

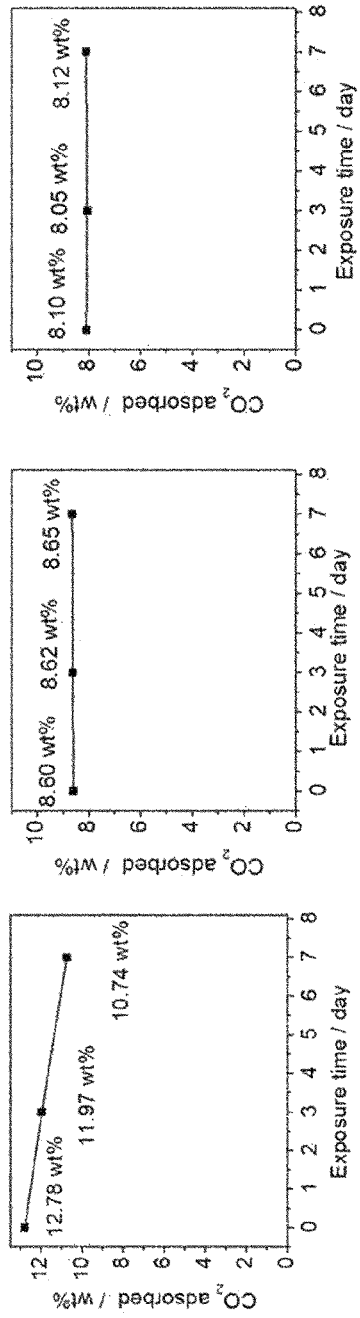
[Fig.10]

[Fig.11]
(a)
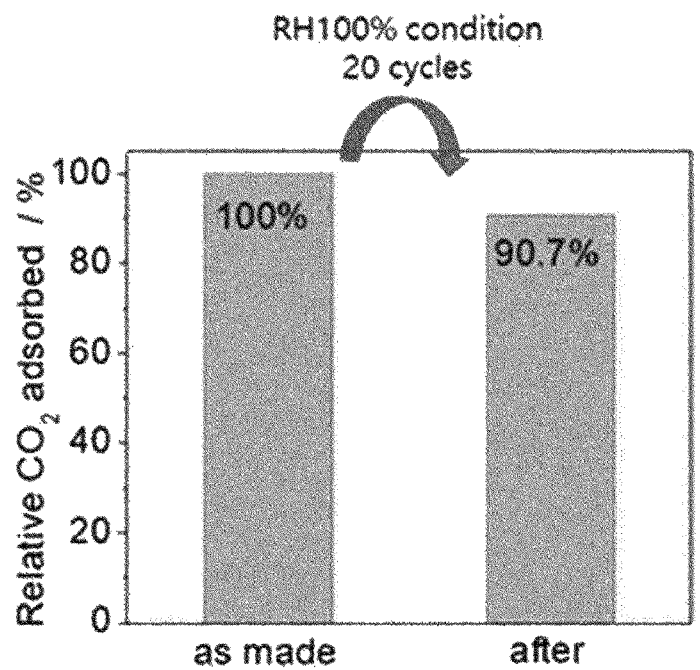
(b)
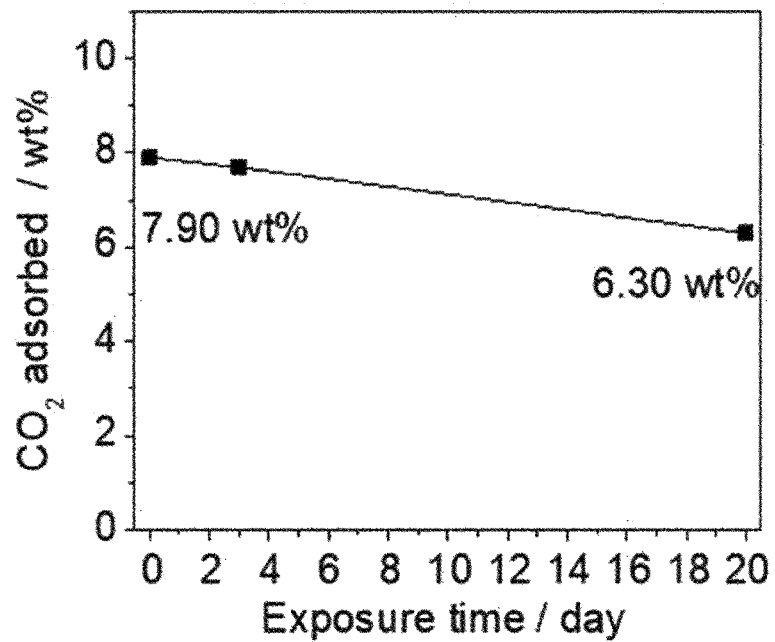

[Fig.12]
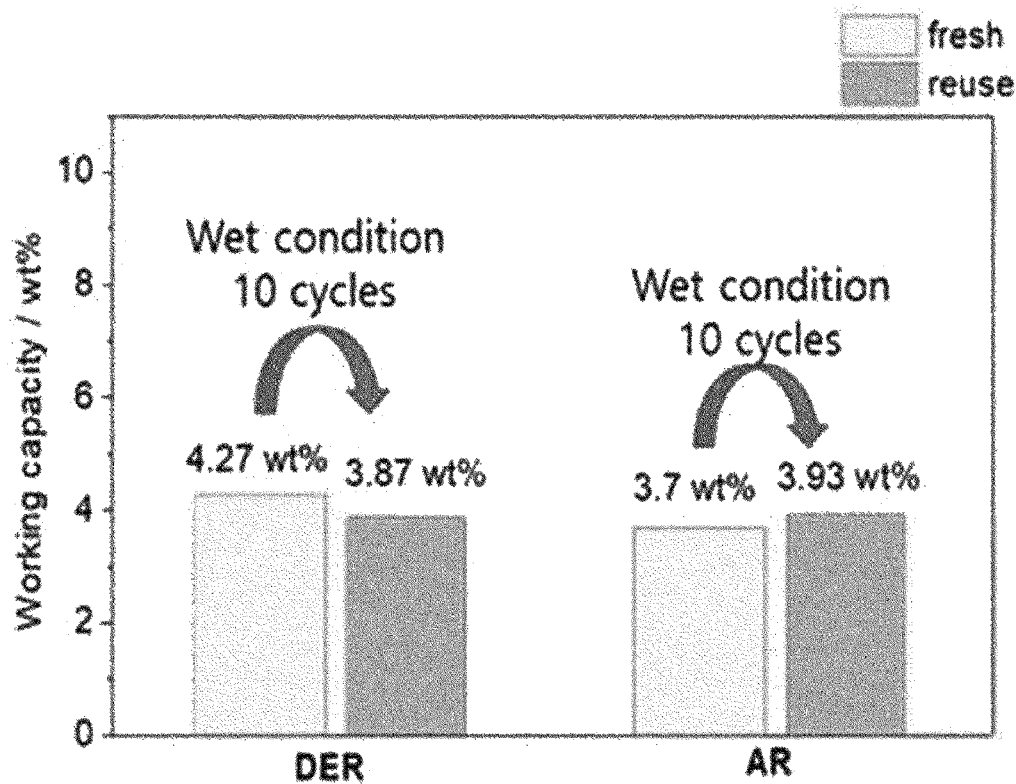
[Fig.13]
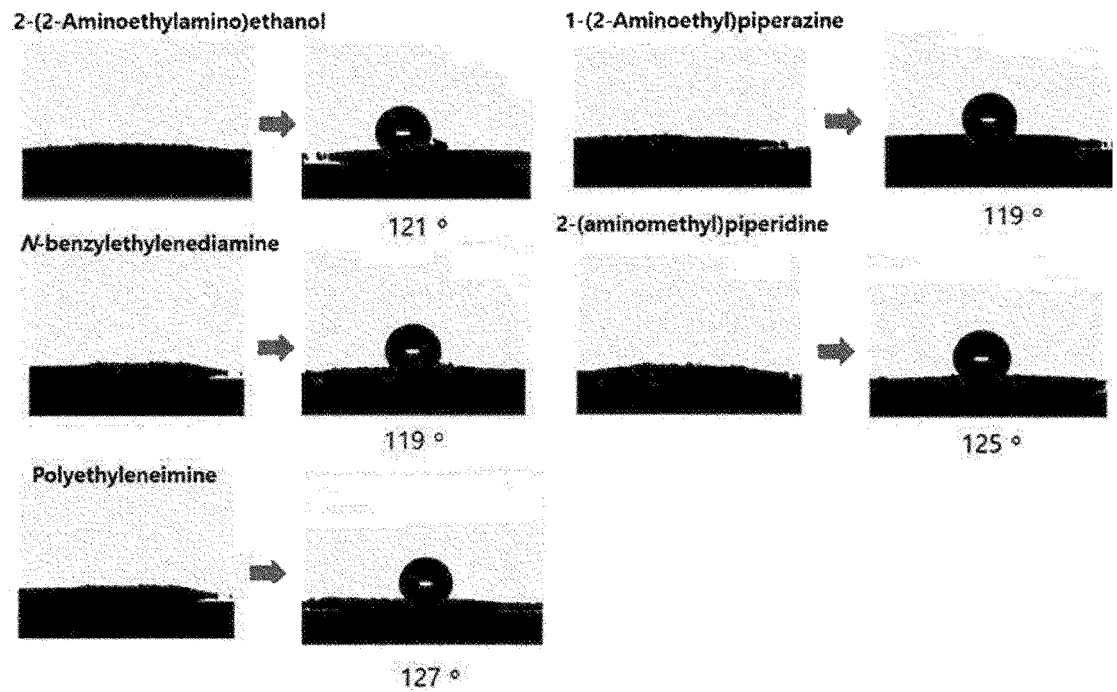

ALKANOLAMINE/AMINE-GRAFTED METAL-ORGANIC FRAMEWORK-BASED CARBON DIOXIDE ADSORBENT

CROSS REFERENCE TO RELATED APPLICATIONS

This application is a U.S. National Stage Application of International Application No. PCT/KR2021/000613, filed on Jan. 15, 2021, which claims the benefit under 35 USC 119 (a) and 365 (b) of Korean Patent Application Nos. 10-2020-0011064, filed on Jan. 30, 2020 and 10-2020-0142694 filed on Oct. 30, 2020, in the Korean Intellectual Property Office, the entire disclosures of which are incorporated herein by reference for all purposes.

TECHNICAL FIELD

The present invention relates to an alkanolamine/amine grafted metal-organic framework-based carbon dioxide adsorbent, and more particularly, to an alkanolamine/amine grafted metal-organic framework-based carbon dioxide adsorbent that is capable of effectively reducing the renewable energy generated during adsorption and desorption of carbon dioxide, of maintaining structural stability against the moisture present in the flue gas, and thus of effectively capturing carbon dioxide in the actual fluidized bed.

BACKGROUND ART 30 to 40% of $CO_2$ emissions, which is the main cause of global warming, derives from thermal power plants and the $CO_2$ concentration in the flue gas is 150 mbar. In the fluidized bed for effective adsorption between gas and solid adsorbents, when the adsorption proceeds to the top of the bed from the bottom of the bed, the concentration of $CO_2$ decreases to 15 mbar at a 90% capture rate. Therefore, the solid adsorbent used in the fluidized bed should be capable of performing adsorption over a wide range of $CO_2$ concentrations.

In addition, after the adsorption process, the adsorbent is transferred to a regenerator and reactivated. However, conventional adsorbents are incapable of performing desorption well in the presence of high concentrations of $CO_2$ at low temperatures and thus are difficult to reuse. Therefore, research is actively conducted on adsorbents having superior adsorption capacity at low concentrations as well as excellent desorption capacity at high concentrations.

Among solid adsorbents, metal-organic frameworks (MOFs) are crystalline solids having coordinated bonds between metals and ligands and advantageously have large surface area and are capable of controlling pores. For this reason, research is underway on the application thereof as an effective adsorbent for $CO_2$ capture, and it has been reported that introduction of amines into MOFs results in great improvement in adsorption capacity through chemical bonding between the amine and the carbon atom of carbon dioxide.

However, it is necessary to maintain the stability of the structure in the wet condition in order to apply conventionally developed MOFs to actual carbon dioxide capture processes. Carbon dioxide, which is the main culprit of global warming, is mainly emitted by thermal power plants and the flue gas emitted from power plants consists of about 15% carbon dioxide and about 75% nitrogen, the total, of which makes up 90% of the volume of flue gas, and about 10% of the balance of flue gas. Thereamong, water occupies about 5 to 7%. When water vapor is present while the MOF adsorbs carbon dioxide, a substitution reaction between the adsorbed carbon dioxide and water may occur, the metal-ligand bond will be broken and the MOF structure will collapse. In addition, acid gases such as sulfur dioxide ($SO_2$) and nitrogen dioxide ($NO_2$) present in trace amounts may affect the MOF structure because they are converted into strong acids through reaction with water. As a result, these components can affect MOF structures and consequently directly affect the carbon dioxide adsorption capacity. Therefore, there is a need to develop carbon dioxide adsorbents capable of maintaining structural stability against moisture and acid gas contained in the power plant flue gas.

DISCLOSURE

Technical Problem

The present invention has been made in an effort to solve the above-described problems associated with the prior art and it is an object of the present invention to provide a carbon dioxide adsorbent based on an MOF including both an alkanolamine and a diamine grafted therewith.

Technical Solution

In accordance with one aspect of the present invention, the above and other objects can be accomplished by the provision of
a carbon dioxide adsorbent including a porous metal-organic framework, polyvalent amine introduced into an open metal site of the porous metal-organic framework, and alkanolamine introduced into the open metal site of the porous metal-organic framework and coexisting with the polyvalent amine.

In an embodiment, the alkanolamine may be formed through a ring-opening reaction between the polyvalent amine and an epoxide compound and introduced into the open metal site of the porous metal-organic framework.

In an embodiment, the carbon dioxide adsorbent may further include aluminum oxide ($Al_2O_3$) bonded to a metal ion of the porous metal-organic framework.

In an embodiment, the carbon dioxide adsorbent may further include hydrophobic silane coated on a surface of a complex formed by bonding between the metal ion of the porous metal-organic framework and the aluminum oxide.

In an embodiment, the porous metal-organic framework may be selected from the group consisting of $M_2$(dobpdc), $M_2$(dobdc), $M_2$(m-dobdc), $M_2$(donde) and $M_2$(dotpdc),
wherein the metal M is Mg, Ti, V, Cr, Mn, Fe, Co, Ni, Cu or Zn, dobpdc represents 4,4'-dioxido-3,3'-biphenyldicarboxylate, dobdc represents 2,5-dioxido-1,4-benzenedicarboxylate, m-dobdc represents 4,6-dioxido-1,3-benzenedicarboxylate, dondc represents 1,5-dioxide-2,6-naphthalenedicarboxylate, and dotpdc represents 4,4'-dioxido-3,3'-triphenyldicarboxylate.

In an embodiment, the polyvalent amine may be a compound represented by the following [Formula I]:

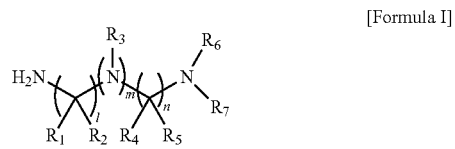

[Formula I]

wherein

R$_1$, R$_2$, R$_4$, and R$_5$ are each independently hydrogen, —F, —Cl, —Br, —CN, —NO$_2$, —OH, —CN, substituted or unsubstituted C$_1$-C$_{30}$ alkyl, or —(CH$_2$)$_p$NR$_a$R$_b$;

R$_3$; Re, and Ry are each independently hydrogen, hydroxy, substituted or unsubstituted C$_1$-C$_{30}$ alkyl, or —(CH$_2$)$_p$NR$_a$R;

l and n are each independently an integer from 1 to 10;

p is each independently an integer from 0 to 10;

m is 0 or 1; and

R$_a$ and R$_b$ are each independently hydrogen, or substituted or unsubstituted C$_1$-C$_{30}$ alkyl.

Also, the compound represented by [Formula I] may be selected from compounds represented by the following Formulas 1 to 6:

![Formula 1: H2N-CH2CH2-NH-CH2CH3]

1

![Formula 2: H2N-CH2CH2-NH-CH2CH2-OH]

2

![Formula 3: H2N-CH2CH2-N(piperazine)-NH]

3

![Formula 4: H2N-CH2-piperidine]

4

![Formula 5: H2N-CH2CH2-NH-CH2-phenyl]

5

![Formula 6: H2N-[CH2CH2-NH]n-CH2CH2-NH]

6 wherein n is an integer from 1 to 10.

In an embodiment, the alkanolamine may be a compound represented by the following [Formula II]:

[Formula II]

![Formula II structure]

wherein R$_1$, R$_2$, R$_4$, R$_5$, R$_7$/and R$_8$ are each independently hydrogen, —F, —Cl, —Br, —CN, —NO$_2$, —OH, —CN, substituted or unsubstituted C$_1$-C$_{30}$ alkyl, benzene or —(CH$_2$)$_p$NR$_a$R$_b$;

R$_3$ and R$_6$ are each independently hydrogen, hydroxy, substituted or unsubstituted C$_1$-C$_{30}$ alkyl, or —(CH$_2$)$_p$NR$_a$R$_b$;

R$_9$ is hydrogen, hydroxy, substituted or unsubstituted C$_1$-C$_{30}$ alkyl, benzene, aryl, —(CH$_2$)$_p$NR$_a$R$_b$, or -(A$_1$-B$_2$-)$_q$CR$_a$R$_b$CR$_c$R$_d$O;

A$_1$ and B$_2$ are each independently 0, NR$_a$, (CR$_b$R$_c$)$_r$, or (C$_6$H$_4$)$_s$;

l and n are each independently an integer from 1 to 10;

r, s, p, and q are each independently an integer from 0 to 10;

m is 0 or 1; and

R$_a$ and R$_b$ are each independently hydrogen, or substituted or unsubstituted C$_1$-C$_{30}$ alkyl.

Also, the compound represented by [Formula II] may be selected from compounds represented by the following Formulas 7 to 8:

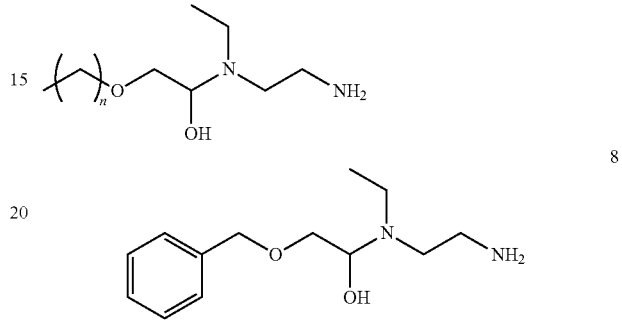

7

8 wherein n is an integer from 1 to 20.

In an embodiment, the epoxide compound may be a compound represented by the following [Formula III]:

[Formula III]

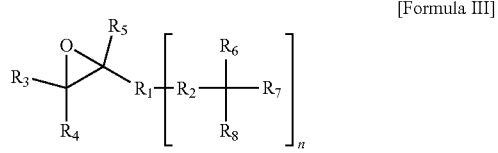

wherein, provided that n is 0, R$_1$ is hydrogen, hydroxy, substituted or unsubstituted C$_1$-C$_{30}$ alkyl, benzene or aryl, and provided that n is 1, R$_1$ is O, NR$_a$, (CR$_b$R$_c$)$_r$, or (C$_6$H$_4$)$_a$;

R$_2$ is O, NR$_a$, (CR$_b$R$_c$)$_r$, or (C$_6$H$_4$)$_s$;

R$_3$, R$_4$, R$_5$, R$_6$, R$_7$, and Re are each independently hydrogen, hydroxy, substituted or unsubstituted C$_1$-C$_{30}$ alkyl, benzene, aryl, —(CH$_2$)$_p$NR$_a$R$_b$, or -(A$_1$-B$_2$-)$_q$CR$_a$R$_b$CR$_c$R$_d$O;

A$_1$ and B$_2$ are each independently 0, NR$_a$, (CR$_b$R$_c$)$_r$, or (C$_6$H$_4$)$_s$;

p, q, r, and s are each independently an integer from 0 to 20; and

R$_a$, R$_b$, R$_c$, and R$_d$ are each independently hydrogen, or substituted or unsubstituted C$_1$-C$_{30}$ alkyl.

Also, the compound represented by [Formula III] may be selected from compounds represented by the following Formulas 9 to 15:

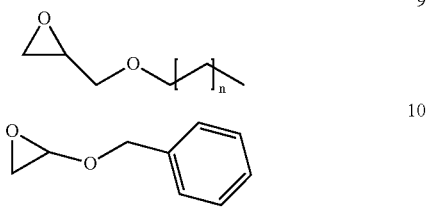

9

10

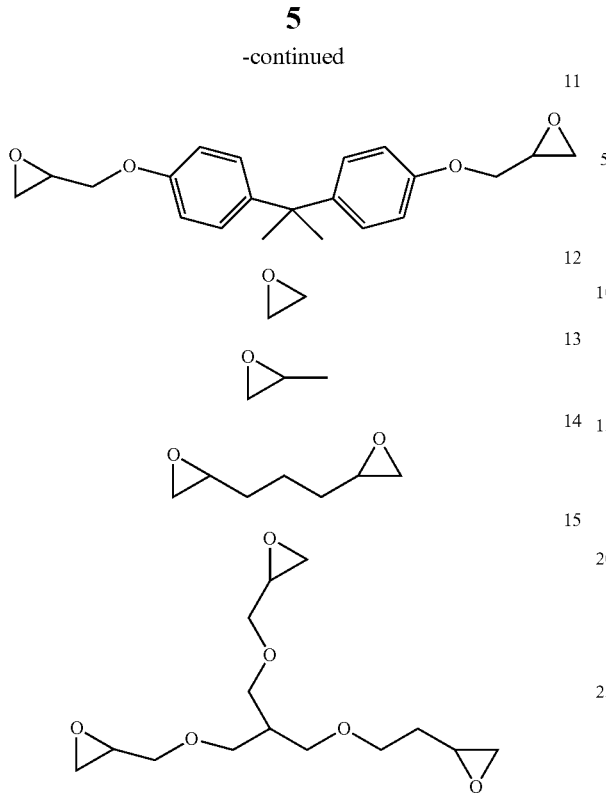

wherein n is an integer from 1 to 20.

In an embodiment, the hydrophobic silane may be a compound represented by the following [Formula IV]:

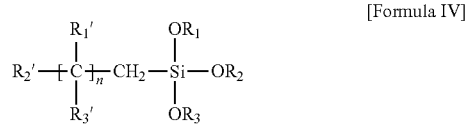

[Formula IV]

wherein $R_1$ to $R_3$ and $R_1'$ to $R_3'$ are each independently hydrogen or $(CH_2)$ m-$CH_3$; and n and m are each independently an integer from 0 to 20.

Also, the hydrophobic silane may be selected from compounds represented by the following [Formula 16] to [Formula 21]:

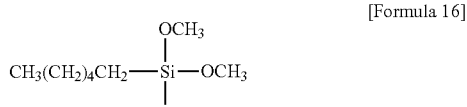

[Formula 16]

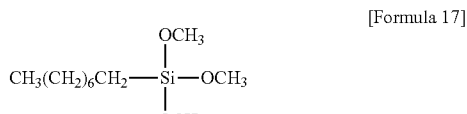

[Formula 17]

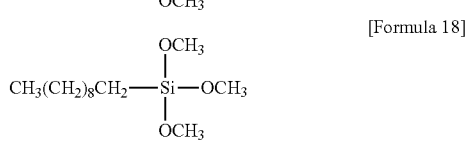

[Formula 18]

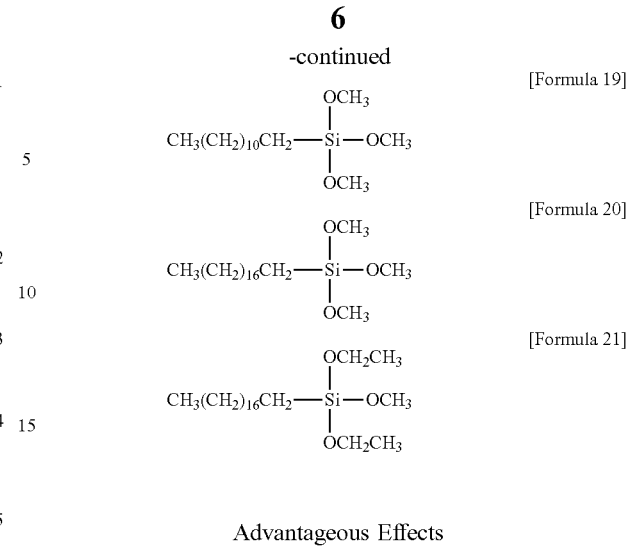

[Formula 19]

[Formula 20]

[Formula 21]

Advantageous Effects

The present invention provides a carbon dioxide adsorbent that is capable of maintaining structural stability against changes in adsorption/desorption temperature and moisture.

DESCRIPTION OF DRAWINGS

FIG. 1 illustrates a mechanism by which alkanolamine is formed by a ring-opening reaction between an amine and an epoxide compound.

FIG. 2 shows PXRD data of (a) een-MOF, (b) een-MOF/Al, and (c) een-MOF/Al—Si measured before and after treatment with glycidyl hexadecyl ether (LC).

FIG. 3 shows IR spectra of (a) een-MOF, (b) een-MOF/Al, and (c) een-MOF/Al—Si before and after treatment with LC.

FIG. 4 shows water contact angles of een-MOF, een-MOF/Al, and een-MOF/Al—Si measured before and after treatment with LC.

FIG. 5 shows the results of comparison in long-term moisture contact angles between samples after introduction of een-MOF/Al—Si and LC.

FIG. 6 shows adsorption performance of een-MOF/Al-LC200 as a function of temperature under 2.5%, 15%, and 100% carbon dioxide conditions.

FIG. 7 shows adsorption performance of een-MOF/Al—Si-LC200 as a function of temperature under 2.5%, 15%, and 100% carbon dioxide conditions.

FIG. 8 shows thermal stability of een-MOF/Al—Si, een-MOF/Al-LC200, and een-MOF/Al—Si-LC200 at a desorption temperature.

FIG. 9 shows the results of adsorption/desorption cycle test of een-MOF/Al—Si, een-MOF/Al-LC200, and een-MOF/Al—Si-LC200 under the wet condition.

FIG. 10 shows the results of long-term exposure to the wet condition of een-MOF/Al—Si, een-MOF/Al-LC200, and een-MOF/Al—Si-LC200.

FIG. 11 shows (a) the result of adsorption/desorption cycle test of een-MOF/Al—Si-LC200 under the 1000 ppm low-pressure carbon dioxide wet condition, and (b) the result of long-term exposure test of een-MOF/Al—Si-LC200 under the condition of RH=95%.

FIG. 12 shows the results of adsorption/desorption cycle test under the wet condition when 1,2-epoxy-3-phenoxypropane (AR) and bisphenol A diglycidyl ether (DER) are used as epoxides.

FIG. 13 shows the water contact angle depending on the type of polyvalent amine measured after reaction with LC.

BEST MODE

Unless defined otherwise, all technical and scientific terms used herein have the same meanings as appreciated by those skilled in the field to which the present invention pertains. In general, the nomenclature used herein is well-known in the art and is ordinarily used.

The present invention provides a carbon dioxide adsorbent that is capable of effectively reducing the renewable energy generated during adsorption and desorption of carbon dioxide and of maintaining structural stability against the moisture present in the exhausted (flue) gas, and thus is effectively useful for a fluidized bed process.

In one aspect, the present invention provides a carbon dioxide adsorbent including a porous metal-organic framework, polyvalent amine introduced into an open metal site of the porous metal-organic framework, and alkanolamine introduced into the open metal site of the porous metal-organic framework and coexisting with the polyvalent amine.

The alkanolamine may be formed through a ring-opening reaction between the polyvalent amine and an epoxide compound (see FIG. 1) and introduced into the open metal site of the porous metal-organic framework.

In an embodiment, the carbon dioxide adsorbent may further include aluminum oxide ($Al_2O_3$) bonded to a metal ion of the porous metal-organic framework.

In an embodiment, in order to improve stability against moisture (moisture resistance), the carbon dioxide adsorbent may further include hydrophobic silane coated on a surface of a complex formed by bonding between the metal ion of the porous metal-organic framework and the aluminum oxide.

The porous metal-organic framework according to the present invention may be selected from the group consisting of $M_2$(dobpdc), $M_2$(dobdc), $M_2$(m-dobdc), $M_2$(donde) and $M_2$(dotpdc). In this case, the metal M is Mg, Ti, V, Cr, Mn, Fe, Co, Ni, Cu or Zn, preferably Mg. Also, dobpdc represents 4,4'-dioxido-3,3'-biphenyldicarboxylate, dobdc represents 2,5-dioxido-1,4-benzenedicarboxylate, m-dobdc represents 4,6-dioxido-1,3-benzenedicarboxylate, donde represents 1,5-dioxide-2,6-naphthalenedicarboxylate, and dotpdc represents 4,4-dioxido-3,3'-triphenyldicarboxylate. These compounds may be represented by the following [organic framework group]:

[Organic Framework Group]

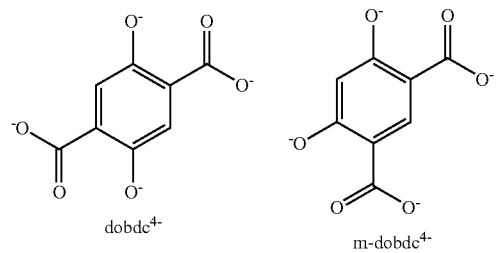

dobdc$^{4-}$
m-dobdc$^{4-}$

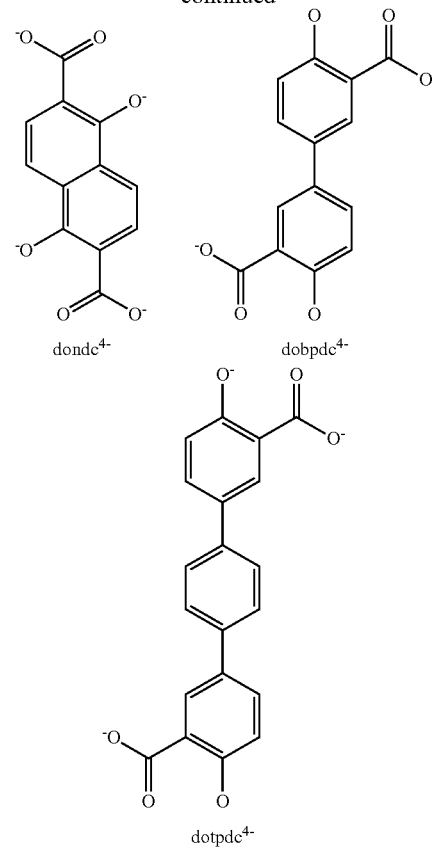

dondc$^{4-}$
dobpdc$^{4-}$
dotpdc$^{4-}$

Also, the polyvalent amine introduced into the porous metal-organic framework of the present invention may include at least one of primary to tertiary amines, and the carbon dioxide adsorbent is capable of capturing carbon dioxide at a low concentration through amine functionalization of the porous metal-organic framework. In particular, in order to capture carbon dioxide in the air, it is preferable to use a porous metal-organic framework including a high density of amines introduced into the pores thereof. The introduction of the high-density amines enables great improvement in the enthalpy of adsorption through the interaction between the amine and the carbon atom of $CO_2$. This amine functionalization is achieved by grafting amines to the open metal site of the porous metal-organic framework and the open metal site acts as a Lewis acid. In this case, the primary amine includes two hydrogen atoms, thus being well coordinated to the open metal site. Also, the remaining free amine can effectively capture $CO_2$ entering the holes.

Specifically, the polyvalent amine may be a compound represented by the following [Formula I]:

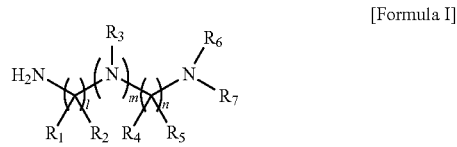

[Formula I]

wherein $R_1$, $R_2$, $R_4$, and $R_5$ are each independently hydrogen, —F, —Cl, —CN, —NO$_2$, —OH, —CN, substituted or unsubstituted $C_1$-$C_{30}$ alkyl, or —(CH$_2$)$_p$NR$_a$R$_b$;

$R_3$, $R_6$, and $R_7$ are each independently hydrogen, hydroxy, substituted or unsubstituted $C_1$-$C_{30}$ alkyl, or —(CH$_2$)$_p$NR$_a$R;

l and n are each independently an integer from 1 to 10;

p is each independently an integer from 0 to 10;

m is 0 or 1; and $R_a$ and $R_b$ are each independently hydrogen, or substituted or unsubstituted $C_1$-$C_{30}$ alkyl.

Also, the compound represented by [Formula I] may be selected from compounds represented by the following Formulas 1 to 6:

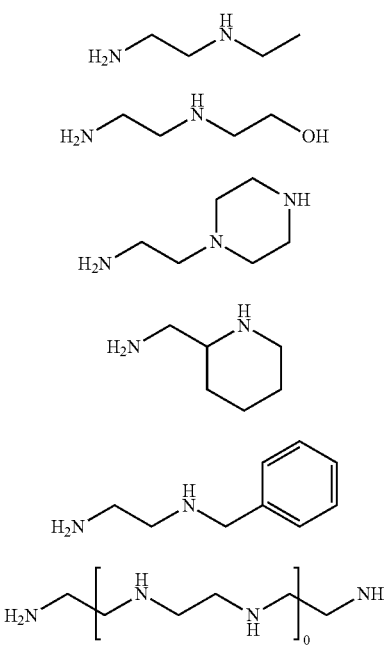

wherein n is an integer from 1 to 10.

More specifically, the polyvalent amine may be selected from ethylethylenediamine (een) ([Formula 1]), 2-(2-aminoethylamino) ethanol ([Formula 2]), 1-(2-aminoethyl) piperazine ([Formula 3]), 2-(aminomethyl) piperidine ([Formula 4]), N-benzylethylenediamine ([Formula 5]), polyethyleneimine ([Formula 6]), ethylenediamine, 1-methylethylenediamine, and 1,1-dimethylethylenediamine.

Next, the alkanolamine introduced into the porous metal-organic framework of the present invention may be formed through a ring-opening reaction between the polyvalent amine and the epoxide compound and based thereon, the polyvalent amine is coordinated and coexists with the alkanolamine at the open metal site of the porous metal-organic framework. As a result, the carbon dioxide adsorbent is capable of retaining structural stability against changes in adsorption/desorption temperature and moisture and of effectively capturing CO$_2$.

Specifically, the alkanolamine may be a compound represented by the following [Formula II];

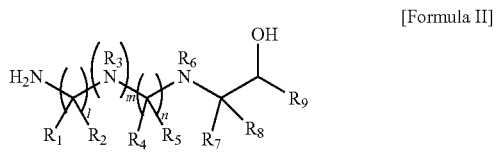

[Formula II]

wherein $R_1$, $R_2$, $R_4$, $R_5$, $R_7$, and $R_8$ are each independently hydrogen, —F, —Cl, —Br, —CN, —NO$_2$, —OH, —CN, substituted or unsubstituted $C_1$-$C_{30}$ alkyl, benzene or —(CH$_2$)$_p$NR$_a$R$_b$;

$R_3$ and Re are each independently hydrogen, hydroxy, substituted or unsubstituted $C_1$-$C_{30}$ alkyl, or —(CH$_2$)$_p$NR$_a$R$_b$;

$R_9$ is hydrogen, hydroxy, substituted or unsubstituted $C_1$-$C_{30}$ alkyl, benzene, aryl, —(CH$_2$)$_p$NR$_a$R$_b$, or -(A$_1$-B$_2$-)$_q$CR$_a$R$_b$CR$_c$R$_d$O;

$A_1$ and $B_2$ are each independently O, NR$_a$, (CR$_b$R$_c$)$_r$, or (C$_6$H$_4$)$_s$;

l and n are each independently an integer from 1 to 10;

r, s, p, and q are each independently an integer from 0 to 10;

m is 0 or 1; and $R_a$ and $R_b$ are each independently hydrogen, or substituted or unsubstituted $C_1$-$C_{30}$ alkyl.

Also, the compound represented by [Formula II] may be selected from compounds represented by the following Formulas 7 to 8:

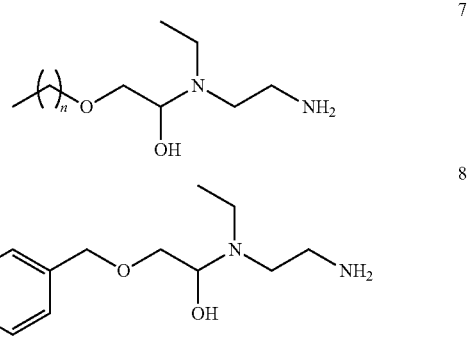

wherein n is an integer from 1 to 20.

The epoxide compound used to introduce the alkanolamine according to the present invention may be used without limitation as long as it contains an epoxide group. Specifically, the epoxide compound may be a compound represented by the following [Formula III];

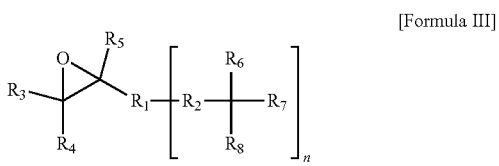

[Formula III]

wherein, provided that n is 0, $R_1$ is hydrogen, hydroxy, substituted or unsubstituted $C_1$-$C_{30}$ alkyl, benzene or aryl, and provided that n is 1, $R_1$ is O, NR$_a$, (CR$_b$R$_c$)$_r$, or (C$_6$H$_4$)$_s$;

$R_2$ is O, $NR_a$, $(CR_bR_c)_r$, or $(C_6H_4)_s$;

$R_3$, $R_4$, $R_5$, $R_7$, and $R_8$ are each independently hydrogen, hydroxy, substituted or unsubstituted $C_1$-$C_{30}$ alkyl, benzene, aryl, —$(CH_2)_pNR_aR_b$, or -$(A_1$-$B_2$-$)_q$ $CR_aR_bCR_cR_dO$;

$A_1$ and $B_2$ are each independently 0, $NR_a$, $(CR_bR_c)_r$, or $(C_6H_4)_s$;

p, q, r, and s are each independently an integer from 0 to 20; and $R_a$, $R_b$, $R_c$, and $R_d$ are each independently hydrogen, or substituted or unsubstituted $C_1$-$C_{30}$ alkyl.

Also, the compound represented by [Formula III] may be selected from compounds represented by the following Formulas 9 to 15:

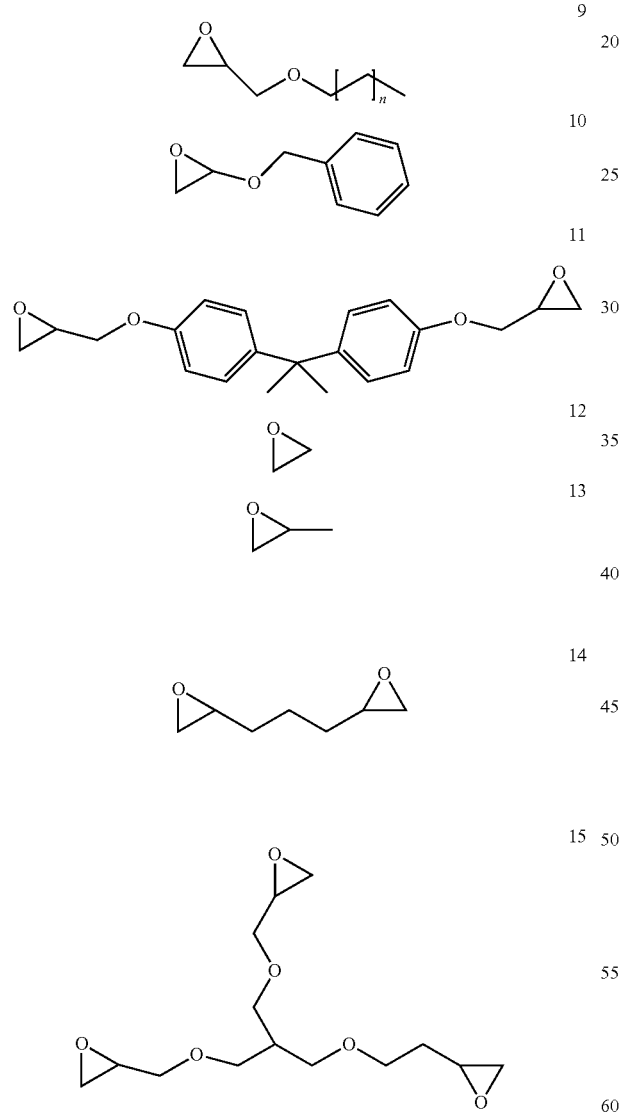

wherein n is an integer from 1 to 20.

More specifically, the epoxide compound may be glycidyl hexadecyl ether (LC) (in [Formula 9], n=13), 1,2-epoxy-3-phenoxypropane (AR) ([Formula 10]) or bisphenol A diglycidyl ether (DER) ([Formula 15]).

Also, the hydrophobic silane used herein may be a compound represented by the following [Formula IV]:

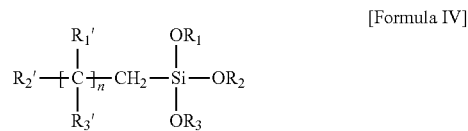

[Formula IV]

wherein $R_1$ to $R_3$ and $R_1'$ to $R_3'$ are each independently hydrogen or $(CH_2)_m$—$CH_3$; and n and m are each independently an integer from 0 to 20.

Also, the hydrophobic silane may be selected from compounds represented by the following [Formula 16] to [Formula 21]:

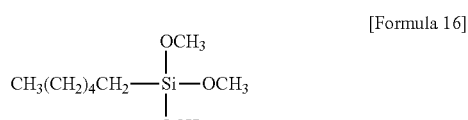

[Formula 16]

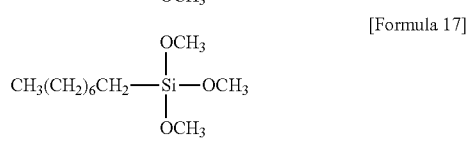

[Formula 17]

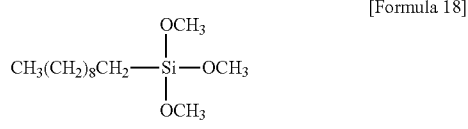

[Formula 18]

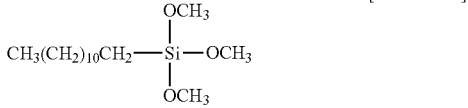

[Formula 19]

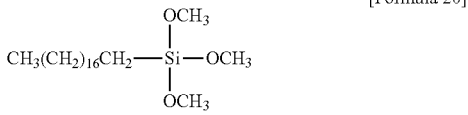

[Formula 20]

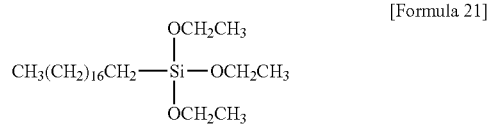

[Formula 21]

In the present invention, as can be seen from examples described later, the carbon dioxide adsorbent according to the present invention is capable of capturing carbon dioxide at a concentration of 400 to 2,000 ppm which is applicable to air purification, and is capable of effectively capturing carbon dioxide at a concentration of 2.5% or higher which is applicable to power plant flue gas capture. Therefore, the present invention provides a carbon dioxide adsorbent capable of maintaining structural stability against changes in adsorption/desorption temperature and moisture.

Mode for Invention

Example

Hereinafter, the present invention will be described in more detail with reference to examples. However, it will be obvious to those skilled in the art that these examples are provided only for illustration of the present invention, and should not be construed as limiting the scope of the present invention. Accordingly, the substantial scope of the present invention is defined by the appended claims and equivalents thereto.

Example. Preparation of Alkanolamine/Diamine Grafted Metal-Organic Framework-Based Carbon Dioxide Adsorbent (1) Preparation of alkanolamine/een-Mg$_2$ (dobpdc)

First, 100 mg of H$_4$dobpdc and 259.47 mg of MgCl$_2$ were weighed, dissolved in 6 mL of DMF and 6 mL of EtOH in a high-pressure reactor, and then reacted at 130° C. for 48 hours to obtain Mg$_2$(dobpdc). The synthesized Mg$_2$ (dobpdc) was immersed in MeOH for 3 days, and 1.5 eq. of N-ethylethylenediamine (een) with respect to Mg$_2$ (dobpdc) was weighed, dissolved in hexane, and reacted under ultrasonic conditions for 12 hours to obtain een-functionalized een-Mg$_2$ (dobpdc) (hereinafter referred to as "een-MOF"). 100 mg of the obtained een-MOF was allowed to react with 200 mg of glycidyl hexadecyl ether (hereinafter referred to as "LC") in the presence of hexane as a solvent at 50° C. for 24 hours. After completion of the reaction, the mixture was filtered using hexane and dried under vacuum to obtain bright yellowish brown alkanolamine/een-Mg$_2$(dobpdc) (referred to as "een-MOF-LC200").

(2) Preparation of alkanolamine/een-Mg$_2$(dobpdc)/Al$_2$O$_3$ complex

First, 300 g of Mg$_2$ (dobpdc) synthesized by the method described above and 334 g of alumina sol were evenly pulverized using a ball-mill and then dried using a spray dryer to obtain a spherical complex (Mg$_2$(dobodc)/Al$_2$O$_3$ (MOF/Al')) of a porous metal-organic framework and alumina oxide. MOF/Al was immersed in MeOH for 3 days, and then 1.5 eq. of een with respect to Mg$_2$ (dobpdc) and hexane were added thereto, followed by inducing reaction at room temperature for 30 minutes. After the reaction was complete, the reaction product was filtered using hexane to obtain an een-functionalized spherical MOF-based complex, een-Mg$_2$ (dobpdc)/Al$_2$O$_3$ (referred to as "een-MOF/Al'"). 100 mg of the obtained een-MOF/Al was allowed to react with 200 mg of LC in the presence of hexane as a solvent at 50° C. for 24 hours. After completion of the reaction, the reaction product was filtered with hexane and dried under vacuum to obtain a bright yellowish brown alkanolamine/een-Mg$_2$(dobpdc)/Al$_2$O$_3$ complex ("een-MOF/Al-LC200").

(3) Preparation of alkanolamine/een-Mg$_2$(dobpdc)/Al$_2$O$_3$-silane complex

The hydrophobic silane used herein was octadecyl(trimethoxy)silane and a silane equivalent to 5 times the weight ratio of the een-MOF/Al synthesized by the above method was reacted with the een-MOF/Al at 50° C. for 72 hours in a hexane solvent. After completion of the reaction, the reaction product was filtered using hexane to obtain silane-coated spherical MOF-based een-Mg$_2$(dobodc)/Al$_2$O$_3$-silane (referred to as "een-MOF/Al—Si"). 100 mg of the obtained een-MOF/Al—Si was allowed to react with 60 mg and 200 mg of LC in the presence of a hexane solvent at 50° C. for 24 hours. After completion of the reaction, the reaction product was filtered using hexane and dried under vacuum to obtain a bright yellowish brown alkanolamine/een-Mg$_2$(dobpdc)/Al$_2$O$_3$-silane complex (referred to as "een-MOF/Al—Si-LC-60", or "een-MOF/Al—Si-LC-200").

Experimental Example 1. Analysis of Basic Characteristics and Hydrophobicity Effect after Treatment with LC An experiment was conducted to analyze the basic properties of the synthesized substances.

First, in order to determine whether or not crystallinity was maintained after treatment with LC epoxide, powder X-ray diffraction analysis was performed and the results are shown in FIG. 2 below. The result of analysis showed that crystallinity of the synthesized substances is maintained even after treatment with epoxide.

Next, in order to determine whether or not alkanolamine was formed by treatment with LC epoxide, IR spectra were measured before and after treatment with LC, and the results are shown in FIG. 3 below. The result of analysis showed the stretching peak corresponding to the C—H chain of LC in the 3,000~2, 800 cm$^{-1}$ region, which was not previously seen in LC-treated een-MOF and een-MOF/Al.

Next, the moisture contact angles of the synthesized substances before and after treatment with LC were measured and the results are shown in FIGS. 4 and 5 below. The result of the analysis showed that both een-MOF and een-MOF/Al, which had been not hydrophobic, became hydrophobic after treatment with LC. Also, een-MOF/Al—Si, which became hydrophobic due to the hydrophobic silane, had a greatly decreased water contact angle 30 minutes before treatment with LC, whereas een-MOF/Al—Si maintained the water contact angle 30 minutes after treatment with LC. This indicates that LC treatment can provide hydrophobicity or improve existing hydrophobicity.

Experimental Example 2. Analysis of Adsorption/Desorption Behaviors Using Thermogravimetric Analyzer after Treatment with LC and Evaluation of Stability at Desorption Temperature Gas adsorption analysis was performed on een-MOF/Al-LC200 and een-MOF/Al—Si-LC200. Specifically, the adsorption performance of each sample was measured at each temperature using a thermogravimetric analyzer at a partial pressure of 2.5%, 15%, and 100% carbon dioxide and the results are shown in FIGS. 6 and 7 below.

The result of the measurement showed that the adsorption performance of een-MOF/Al-LC200 started to deteriorate at a temperature of 90° C. or higher under the 2.5% carbon dioxide partial pressure condition and that desorption was superior to adsorption at a temperature of 100° C. or higher. Also, the result showed that, under the condition of 15% carbon dioxide partial pressure, the adsorption performance was deteriorated at a temperature of 110° C. or higher, and desorption proceeded at a temperature of 120° C. or higher. This indicates that the temperature appropriate for adsorption of 2.5% to 15% carbon dioxide generated in the flue gas was 80° C. or less. Desorption performance was measured at 100% carbon dioxide partial pressure to determine the desorption conditions. As a result, it was found that desorption proceeded at 130° C. or higher and complete desorption proceeded at 140° C. or higher. Therefore, an appropriate desorption temperature was set to 140° C.

The appropriate adsorption and desorption temperatures of een-MOF/Al—Si-LC200 were found to be 80° C. or lower and 140° C., respectively.

For een-MOF/Al—Si, which was not treated with LC, the coordinated diamine continuously evaporated at a desorption temperature of 140° C. This is due to the low evaporation point of the monomolecular diamine, which may be a major obstacle to reusability of the adsorbent. When a molecule with a long chain such as LC is introduced to overcome this obstacle, the LC binds to the diamine in the pores close to the surface and the long carbon chain of the bound LC molecule prevents the amine from evaporating and being lost.

The adsorption performance was compared between the sample to which LC was introduced and the sample to which no LC was introduced at a high desorption temperature (140° C.) before and after exposure for 24 hours to obtain specific results (FIG. 8). The results showed that een-MOF/Al—Si had a great decrease in the adsorption performance from 9.80 wt % to 7.86 wt % after exposure at 140° C. for 24 hours, whereas een-MOF/Al-LC200 and een-MOF/Al—Si-LC200, to which LC was introduced, maintained the adsorption performance even after exposure at 140° C. for 24 hours. These results showed that additional treatment with LC can reduce the amine continuously evaporated at the desorption temperature and thereby increase the reusability efficiency.

Experimental Example 3. Evaluation of Water Stability after Treatment with LC

A stability test was performed using the LC-treated sample under carbon dioxide and moisture conditions, which are actual flue gas conditions. Specifically, adsorption/desorption cycles were measured using a thermogravimetric analyzer under adsorption conditions of 2.5% $CO_2$, 7% $H_2O$, and 80° C., and under desorption conditions of 93% $CO_2$, 7% $H_2O$, and 140° C. 10 adsorption/desorption cycles were performed and the adsorption performance before and after the cycles was compared to indirectly determine whether or not the sample was stable against moisture. The result of analysis showed that een-MOF/Al—Si exhibited a reduction in adsorption performance by more than half after 10 cycles under the wet condition, whereas een-MOF/Al-LC200 and een-MOF/Al—Si-LC200 maintained the adsorption performance of 88% and 95% even after 20 cycles under the wet condition (FIG. 9).

In order to evaluate stability to moisture in more detail, long-term exposure experiments were conducted under desorption conditions of 93% $CO_2$, 7% $H_2O$, and 140° C. The adsorption performance was evaluated before and after exposure to moisture to determine stability. The result of analysis showed that the adsorption performance of een-MOF/Al—Si continued to deteriorate when exposed to the same conditions as above for 7 days, whereas een-MOF/Al-LC200 and een-MOF/Al—Si-LC200 maintained the adsorption performance under the same conditions (FIG. 10).

Next, the adsorption/desorption cycles of een-MOF/Al—Si-LC200 were measured at 1,000 ppm carbon dioxide under the wet condition to determine applicability thereof to the field of air purification rather than as an adsorbent under flue gas conditions. A thermogravimetric analyzer was used under adsorption conditions of 1,000 ppm $CO_2$, RH 100% and 30° C., and desorption conditions of 1,000 ppm $CO_2$, 4.2% $H_2O$, and 70° C. The results of analysis showed that the adsorption performance was maintained without a great decrease in performance even under 1000 ppm carbon dioxide moisture condition (FIG. 11(a)). The result of exposure to RH 95% and 30° C. for 20 days showed that the adsorption performance of 85% or more could be maintained (FIG. 11(b)).

Experimental Example 4. Determination of Performance of Adsorbent Depending on Type of Epoxide or Polyvalent Amine (1) First, synthesis was performed in the same manner as in een-MOF/Al-LC200, except that 1,2-epoxy-3-phenoxypropane (AR) or bisphenol A diglycidyl ether (DER) was used instead of LC as an epoxide compound. Each of the synthesized samples was subjected to adsorption/desorption cycles under adsorption conditions at 2.5% $CO_2$, 7% $H_2O$, 80° C., and desorption conditions at 93% $CO_2$, 7% $H_2O$, and 140° C. The results are shown in FIG. 12 below. The result of measurement showed, although other epoxide compounds such as 1,2-epoxy-3-phenoxypropane (AR) or bisphenol A diglycidyl ether (DER) were used instead of LC, the performance was maintained comparable to een-MOF/Al-LC200, even after adsorption/desorption cycles.

(2) Then, synthesis was performed in the same manner as in een-MOF/Al-LC200, except that 2-(2-aminoethylamino) ethanol, 1-(2-aminoethyl) piperazine, 2-(aminomethyl) piperidine, N-benzylethylenediamine, or polyethyleneimine was used as the polyvalent amine instead of een. The water contact angle of each synthesized sample was measured and the results are shown in FIG. 13 below. The result of measurement showed that the water contact angle was not formed in the samples functionalized with only amine before treatment with LC, whereas the water contact angle was formed after treatment with LC, which indicates that the epoxide compound did not selectively react with een, but could react with various amines, and exhibited hydrophobicity through a long carbon chain.

Although specific configurations of the present invention have been described in detail, those skilled in the art will appreciate that this detailed description is provided as preferred embodiments for illustrative purposes and should not be construed as limiting the scope of the present invention. Therefore, the substantial scope of the present invention is defined by the accompanying claims and equivalents thereto.

INDUSTRIAL APPLICABILITY

The carbon dioxide adsorbent according to the present invention is capable of effectively maintaining structural stability against changes in adsorption/desorption temperature and moisture and thus is applicable to a variety of industrial fields requiring carbon dioxide capture.

The invention claimed is:
1. A carbon dioxide adsorbent comprising
a porous metal-organic framework;
polyvalent amine introduced into an open metal site of the porous metal-organic framework; and
alkanolamine introduced into the open metal site of the porous metal-organic framework and coexisting with the polyvalent amine,
wherein the alkanolamine is selected from the group consisting of the compounds represented by the following Formulas 7 to 8:

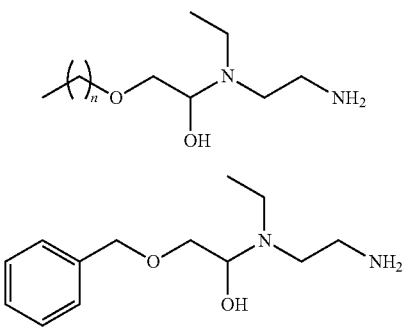

wherein n is an integer from 1 to 20.

2. The carbon dioxide adsorbent according to claim 1, wherein the alkanolamine is formed through a ring-opening reaction between the polyvalent amine and an epoxide compound and introduced into the open metal site of the porous metal-organic framework.

3. The carbon dioxide adsorbent according to claim 1, further comprising aluminum oxide (Al$_2$O$_3$) bonded to a metal ion of the porous metal-organic framework.

4. The carbon dioxide adsorbent according to claim 3, further comprising hydrophobic silane coated on a surface of a complex formed by bonding between the metal ion of the porous metal-organic framework and the aluminum oxide.

5. The carbon dioxide adsorbent according to claim 1, wherein the porous metal-organic framework is selected from the group consisting of M$_2$(dobpdc), M$_2$(dobdc), M$_2$(m-dobdc), M$_2$(dondc) and M$_2$(dotpdc),
  wherein a metal M is Mg, Ti, V, Cr, Mn, Fe, Co, Ni, Cu or Zn,
  dobpdc represents 4,4'-dioxido-3,3'-biphenyldicarboxylate,
  dobdc represents 2,5-dioxido-1,4-benzenedicarboxylate,
  m-dobdc represents 4,6-dioxido-1,3-benzenedicarboxylate,
  dondc represents 1,5-dioxide-2,6-naphthalenedicarboxylate, and
  dotpdc represents 4,4'-dioxido-3,3'-triphenyldicarboxylate.

6. The carbon dioxide adsorbent according to claim 1, wherein the polyvalent amine is a compound represented by the following [Formula I]:

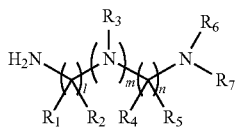
[Formula I]

wherein
R$_1$, R$_2$, R$_4$, and R$_5$ are each independently hydrogen, —F, —Cl, —Br, —CN, —NO$_2$, —OH, substituted or unsubstituted C$_1$-C$_{30}$ alkyl, or —(CH$_2$)$_p$NR$_a$R$_b$;
R$_3$, R$_6$, and R$_7$ are each independently hydrogen, hydroxy, substituted or unsubstituted C$_1$-C$_{30}$ alkyl, or —(CH$_2$)$_p$NR$_a$R;
l and n are each independently an integer from 1 to 10;
p is each independently an integer from 0 to 10;
m is 0 or 1; and
R$_a$ and R$_b$ are each independently hydrogen, or substituted or unsubstituted C$_1$-C$_{30}$ alkyl.

7. The carbon dioxide adsorbent according to claim 6, wherein the compound represented by [Formula I] is selected from compounds represented by the following Formulas 1 to 6:

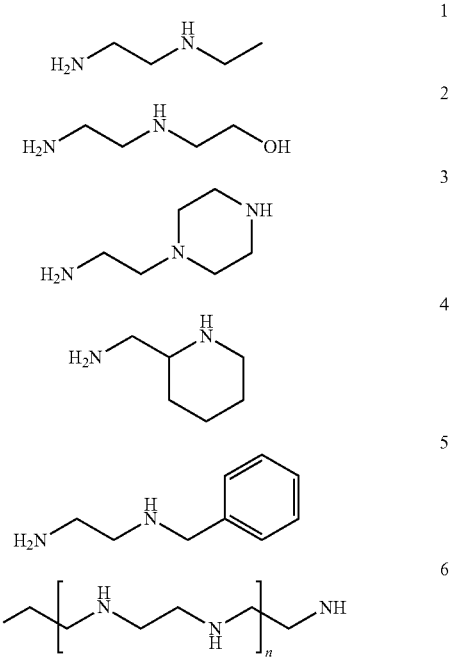

wherein n is an integer from 1 to 10.

8. The carbon dioxide adsorbent according to claim 2, wherein the epoxide compound is a compound represented by the following [Formula III]:

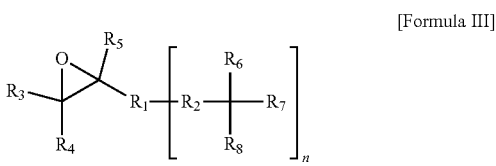
[Formula III]

wherein, provided that n is 0, R$_1$ is hydrogen, hydroxy, substituted or unsubstituted C$_1$-C$_{30}$ alkyl, benzene or aryl, and provided that n is 1, R$_1$ is O, NR$_a$, (CR$_b$R$_c$)$_r$, or (C$_6$H$_4$)$_s$;
R$_2$ is O, NR$_a$, (CR$_b$R$_c$)$_r$, or (C$_6$H$_4$)$_s$;
R$_3$, R$_4$, R$_5$, R$_6$, R$_7$, and R$_8$ are each independently hydrogen, hydroxy, substituted or unsubstituted C$_1$-C$_{30}$ alkyl, benzene, aryl, —(CH$_2$)$_p$NR$_a$R$_b$, or -(A$_1$-B$_2$-)$_q$CR$_a$R$_b$CR$_c$R$_d$O;
A$_1$ and B$_2$ are each independently O, NR$_a$, (CR$_b$R$_c$)$_r$, or (C$_6$H$_4$)$_s$;
p, q, r, and s are each independently an integer from 0 to 20; and
R$_a$, R$_b$, R$_c$, and R$_d$ are each independently hydrogen, or substituted or unsubstituted C$_1$-C$_{30}$ alkyl.

9. The carbon dioxide adsorbent according to claim 8, wherein the compound represented by [Formula III] is selected from compounds represented by the following Formulas 9 to 15:

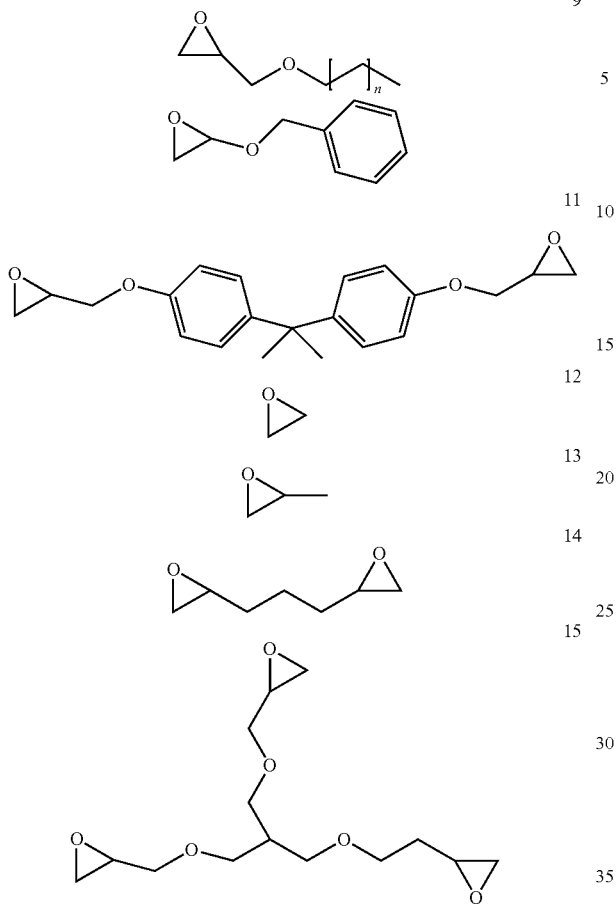

wherein n is an integer from 1 to 20.

10. The carbon dioxide adsorbent according to claim 4, wherein the hydrophobic silane is a compound represented by the following [Formula IV]:

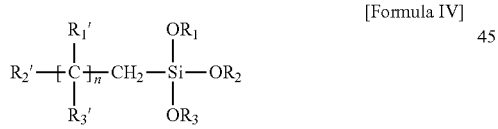

[Formula IV]

wherein $R_1$ to $R_3$ and $R_1'$ to $R_3'$ are each independently hydrogen or $(CH_2)$ m-$CH_3$; and n and m are each independently an integer from 0 to 20.

11. The carbon dioxide adsorbent according to claim 10, wherein the hydrophobic silane is selected from compounds represented by the following [Formula 16] to [Formula 21]:

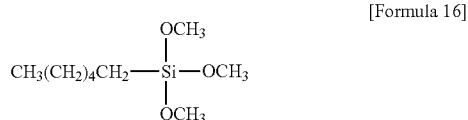

[Formula 16]

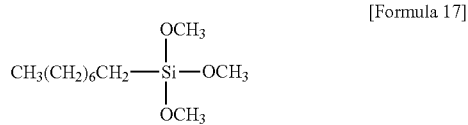

[Formula 17]

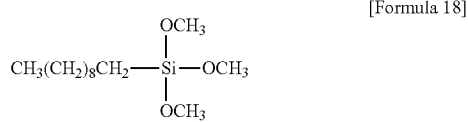

[Formula 18]

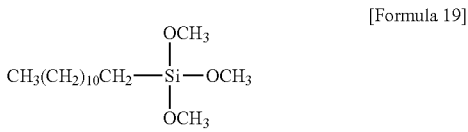

[Formula 19]

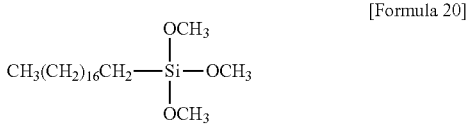

[Formula 20]

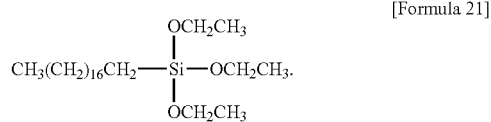

[Formula 21]

* * * * *